April 21, 1936.  H. F. NELSON  2,038,232
BICYCLE LOCK
Filed May 3, 1935
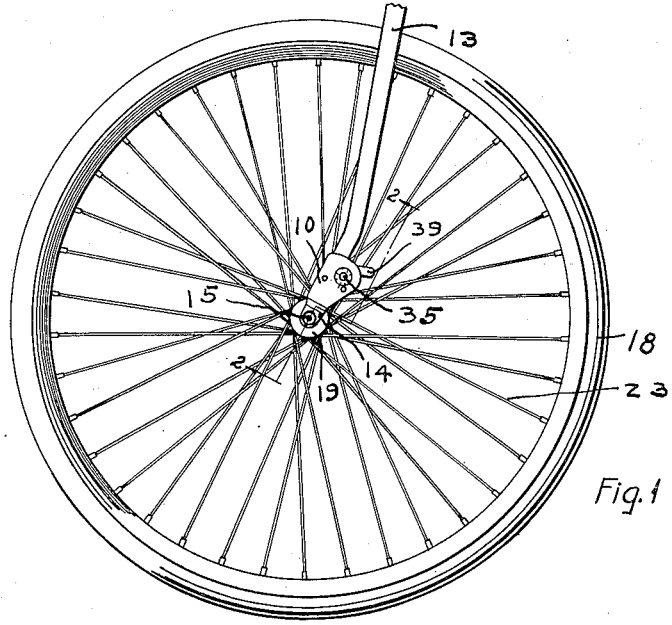
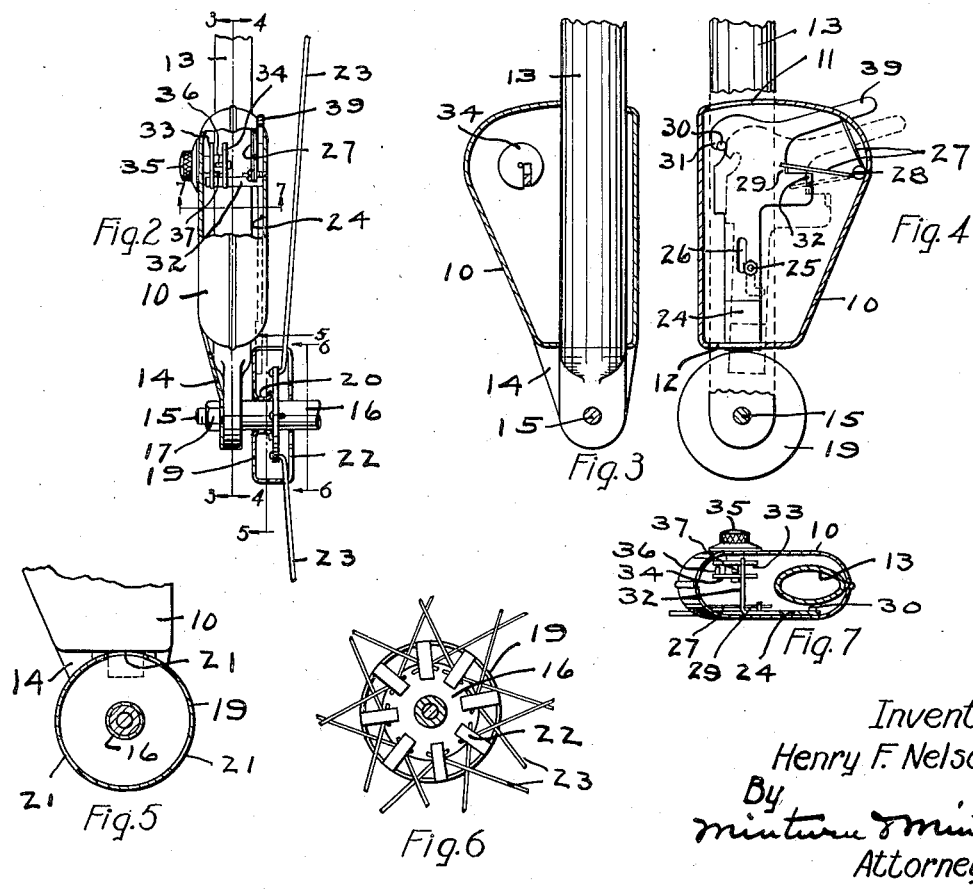
Inventor,
Henry F. Nelson.
By Minturn & Minturn
Attorneys.

Patented Apr. 21, 1936

2,038,232

UNITED STATES PATENT OFFICE 2,038,232

BICYCLE LOCK

Henry F. Nelson, Danville, Ill.

Application May 3, 1935, Serial No. 19,557

6 Claims. (Cl. 70—90)

This invention relates to a bicycle lock and has for a primary object the provision of a structure which may be secured to the bicycle without having to alter any part of the bicycle and at the same time which, through its own locking device, will prevent unwarranted removal from the bicycle.

A further primary object of my invention is to provide a structure which is extremely simple and which may be produced at a very low cost of production but at the same time will be extremely useful and durable and effective for the purpose intended.

A further important object of my invention is to provide a safety retaining device readily operated externally of the locking mechanism so that when the bicycle is being used, there is no danger of the mechanism accidentally locking.

A still further important object of my invention is to provide the locking device in such form that it may be operated without keys and also will have a neat and unobtrusive appearance. These and other objects and advantages such as in the particular mode of application in the various elements and their particular combinations one with the other, will become apparent to those versed in the art in the one particular form of the invention as illustrated by the accompanying drawing, in which Fig. 1 is a side elevation of a bicycle wheel and part of its attached fork with my invention applied thereto;

Fig. 2, a section on the line 2—2 in Fig. 1;

Fig. 3, a section on the line 3—3 in Fig. 2;

Fig. 4, a section on the line 4—4 in Fig. 2;

Fig. 5, a section on the line 5—5 in Fig. 2;

Fig. 6, a vertical section on the line 6—6 in Fig. 2, and

Fig. 7, a transverse section on the line 7—7 in Fig. 2.

Like characters of reference indicate like parts throughout the several views in the drawing.

I form a housing 10 out of metal preferably in two parts centrally joined around its periphery. This housing is provided with an upper aperture 11 and a lower aperture 12 of the proper shape and dimensions to permit the housing to be mounted over the lower end of the bicycle fork 13. From one side of the housing 10 extends an ear 14 having a hole therethrough to receive the mounting bolt 15 which secures the wheel hub 16 in place between the lower ends of the fork 13. The bolt nut 17 is drawn against the ear 14 to compress it snugly against the lower end of the fork so that the housing 10 is then fixed in position on the fork member 13 and can not be moved upwardly or downwardly therealong nor can it be rotated therearound. On the hub 16 of the wheel 18 I mount a ring or collar 19 which has an inner central hole formed to fit over the hub between the spokes of the wheel 18 and the fork member 13. Preferably this hole is provided with an inturned flange 20 which serves as a bearing against the hub. The outer periphery of the ring 19 is provided with three notches or slots 21, Fig. 5, preferably spaced equi-distant therearound. The ring is secured in place on the hub 16 by means of fingers 22 extending inwardly between the spokes 23 of the wheel 18 and are then bent downwardly and around against the flange from which the spokes 23 extend, Fig. 6. Thus the ring 19 must revolve with the wheel 18.

In the housing 10 I place a latch bar 24 here shown as having a stud 25 extending from the housing through a longitudinally positioned slot 26 in the bar 24 so that the bar may reciprocate along this stud 25 within the limits of the slot 26. The lower end of the bar 24 when moved to the limit of downward travel projects through an aperture in the housing a sufficient distance to cause the latch bar to enter any one of the notches 21 in the ring 19 as the wheel may be turned therepast. A torsion spring 27 is carried by a post 28 in the housing to have one end bear against a housing and its other end bear against an ear 29 on the bar 24 so that the spring normally urges the bar to its lower-most position as indicated by the dash lines in Fig. 4.

The upper end of the bar 24 has an arm 39 which extends out rearwardly through a slot in the housing 10 whereby by lifting on the arm 39, the bar 24 may be lifted against the pressure of the spring 27. In order to hold the bar 24 in the lifted position, I provide a post 30 secured to the housing 10 and form a hook 31 in the upper end of the bar 24 on the side removed from the arm 39 so that when the bar 24 is lifted by the arm 39, to have the hook 31 above the post 30, the arm 39 upon being pushed around laterally will carry the hook over the post 30 and thereby permit the hook to engage that post upon a slight downward movement of the bar 24 under the influence of the spring 27.

The periphery of the housing 10 is properly formed as indicated in Figs. 3 and 4 so that the arm 39 projecting through the upper portion thereof will be normally lifted and shoved laterally over the post 30 by the finger of the operator sliding around over that curved portion of the housing as best indicated in Fig. 4. In further reference to the slot 26, I provide a lateral slot leading off from the lower end of the slot 26 to permit the bar 24 to be rocked laterally over the post 30 when the bar is in its upper position. This lateral slot is necessary since the lower end of the bar 24 remains in the opening in the under side of the housing 10 to pivot therein.

To lock the wheel 18 against rotation, the arm 39 is lifted upwardly and pulled outwardly to allow the spring 27 to drop the bar 24 to the dash line position as indicated in Fig. 4. In order to prevent the bar 24 from being lifted to release the wheel 18, I provide a tongue 32 extending laterally from the bar 24, here shown as from a wing thereof to have the tongue extend across the housing. Above this tongue 32 and in the path thereof I mount a pair of disks 33 and 34 on a common axis so that when the bar 24 is attempted to be lifted by the arm 39, the tongue 32 will strike the periphery of both of these disks and thereby prevent that lifting. The inner disk 34 is fixed to revolve with an external knob 35 and has a pin 36 directed toward the other disk 33 which is free to revolve independently of the disk 34. A pin 37 is fixed on the disk 33 to be in the path of the pin 36 so that upon a maximum complete revolution of the disk 34 by the knob 35, the pin 36 will come around and strike the pin 37 and then carry the disk 33 along therewith. Both disks 33 and 34 are provided with slots entering from their periphery into which the tongue 32 may enter when both slots are in alignment thereacross. In order to align these slots, the knob 35 is first turned to have the disk 34 come around and carry the disk 33 to that position where its slot will be positioned to receive the tongue 32 therein. Then the knob 35 is turned in the reverse direction to carry the disk 34 around to have the slot in it brought into position to align with the other slot and to receive the tongue 32 therein. When the two slots are thus aligned, the bar 24 may then be raised by lifting on the arm 39 to have the tongue 32 enter within the slots. It is to be understood, of course, that the slot in the disk 34 is angularly positioned from the pin 36 a greater distance than is the slot in the disk 33. Therefore by knowing the proper combination of left and right turns of the knob 35, the disks 33 and 34 may be properly aligned to permit withdrawal of the bar 24 from the ring 19. When the bar is to be returned to the locked position, it is lowered as above indicated and then the knob 35 is given a turn to throw the slots in the disks out of alignment. By variably positioning the slots in the disks, a wide range of combinations may be secured.

While I have described and shown my invention in the best form as now known to me, it is obvious that structural changes may be made without departing from the spirit of the invention and I, therefore, do not desire to be limited beyond the limitations imposed by the following claims.

I claim:

1. In a lock for a bicycle having a wheel, a wheel hub, a frame part such as a wheel fork, a hub mounting bolt, a lock housing through which a part of the fork passes, an ear on the housing engaged by said bolt, and a ring engaging said wheel concentrically of the hub, the combination of a laterally swingable latch bar in the housing normally spring urged to extend from the housing against said ring, said ring having recesses therein to receive said bar, means operable by laterally swinging the bar for retaining said bar out of engagement with the ring in the unlocked position, and a locking mechanism carried by the housing operable to prevent disengagement of the bar from the ring, the engagement of said bar with said ring preventing rotation of the wheel.

2. For a bicycle having a wheel hub, a fork, and a bolt mounting the hub on the fork, a housing having top and bottom openings to permit the housing to be assembled around a fork member, an ear extending from the housing to be engaged by said bolt to fix the housing in position along the fork, and a clamp formed to fit concentrically over and be engaged to the hub end and having bolt engaging means in its periphery, the combination with a bolt slidably and swingably carried in the housing, spring means normally urging the bolt to extend outwardly through a hole in the housing into said bolt engaging means to prevent wheel rotation, an arm extending from the bolt outwardly through a slot in the housing as a means for swinging the bolt and lifting it away from said clamp, of a post engaged by the bolt in its swinging and lifted position, a pair of slotted disks in the housing, a member extending from the bolt in the path of the disks, said disks normally preventing swinging and lifting of the bolt by reason of said member striking the disks, and means externally of the housing for arranging the slots in the disks to match and permit said member to enter therein for upward travel.

3. For a bicycle having a wheel hub, a fork, and a bolt mounting the hub on the fork, a housing having top and bottom openings to permit the housing to be placed on the fork, an ear extending from the housing to be engaged by said bolt to fix the housing in position along the fork, and a clamp formed to fit concentrically over and be engaged to the hub end and having bolt engaging means in its periphery, the combination with a bolt slidably and swingably carried in the housing, spring means normally urging the bolt to extend outwardly through a hole in the housing into said bolt engaging means to prevent wheel rotation, an arm extending from the bolt outwardly through a slot in the housing as a means for swinging the bolt and lifting it away from said clamp, of a post engaged by the bolt in its lifted position, a pair of slotted disks in the housing, a member extending from the bolt in the path of the disks, said disks normally preventing lifting of the bolt by reason of said member striking the disks, and means externally of the housing for arranging the slots in the disks to match and permit said member to enter therein for upward travel, said post being positioned laterally of the axis of the bolt requiring lateral travel of the bolt to effect engagement therewith, and said housing being sloped adjacent said arm whereby an operator's finger sliding thereover under said arm automatically lifts and carries the arm laterally into said engagement.

4. For a bicycle having a wheel hub, a fork, and a bolt mounting the hub on the fork, a housing having top and bottom openings to permit the housing to be placed on the fork, an ear extending from the housing to be engaged by said bolt to fix the housing in position along the fork, and a clamp formed to fit concentrically over and be engaged to the hub end and having bolt engaging means in its periphery, the combination with a bolt slidably and swingably carried in the housing, spring means normally urging the bolt to extend outwardly through a hole in the housing into said bolt engaging means to prevent wheel rotation, an arm extending from the bolt outwardly through a slot in the housing as a means for swinging the bolt and lifting it away from said clamp, of a post engaged by the bolt in its lifted position, a pair of slotted disks in the housing, a member extending from the bolt in the path of the disks, said disks normally preventing lifting of the bolt by reason of said member striking the disks, and means externally of the housing for arranging the slots in the disks to match and permit said member to enter therein for upward travel, a pin entering a longitudinal slot in said bar confining it to longitudinal travel, said bar having a lateral slot leading from the longitudinal slot to permit rocking of the bar across said pin to permit said engagement.

5. In a lock for a bicycle having a wheel with a member concentrically of the hub of the wheel with bolt engaging formations therein and having a housing adjacent the concentric member, the combination of a latch bar having an arm for manually lifting the bar and a longitudinal slot and also having a hook opposite the arm, a relatively fixed stud extending into the slot in the bar, a spring contacting the ear on the bar and normally urging the bar into contact with concentric hub member and a relatively fixed post engaged by the hook on the bar when the bar is pushed laterally against it.

6. In a lock for a bicycle having a wheel with a member concentrically of the hub of the wheel with a series of peripheral bolt engaging formations, a wheel fork and a housing through which one of the fork members passes, said housing having a curved upper portion and said housing terminating adjacent the concentric hub member with a bolt opening in said terminal portion, the combination of a latch bar mounted in the housing and having an arm extending out of the housing through the curved upper portion of the housing and said bar having a longitudinal slot with a lateral extension at its lower end and said bar having a hook opposite the arm, a stud fixed to the housing and entering the slot in the bar, a spring contacting the bar and normally urging the bar into contact with the concentric hub member and a post fixed to the housing and engaged by the hook on the bar when the lifted bar is pushed laterally against it.

HENRY F. NELSON.